(12) United States Patent
Shakespeare et al.

(10) Patent No.: US 9,326,264 B2
(45) Date of Patent: Apr. 26, 2016

(54) METHOD OF DETERMINING LOCATION

(75) Inventors: Neil Richard Shakespeare, Slough (GB); Glyn Povah, Slough (GB); Steve Devereux, Slough (GB); Jamie Finn, Slough (GB)

(73) Assignee: TELEFONICA DIGITAL LIMITED, Slough (GB)

( * ) Notice: Subject to any disclaimer, the term of this patent is extended or adjusted under 35 U.S.C. 154(b) by 194 days.

(21) Appl. No.: 14/237,009

(22) PCT Filed: Aug. 6, 2012

(86) PCT No.: PCT/GB2012/051907
§ 371 (c)(1),
(2), (4) Date: Jun. 20, 2014

(87) PCT Pub. No.: WO2013/021192
PCT Pub. Date: Feb. 14, 2013

(65) Prior Publication Data
US 2014/0315574 A1 Oct. 23, 2014

(30) Foreign Application Priority Data
Aug. 5, 2011 (GB) .................................. 1113565.4

(51) Int. Cl.
*H04W 24/00* (2009.01)
*H04W 64/00* (2009.01)
*H04W 24/08* (2009.01)

(52) U.S. Cl.
CPC .............. *H04W 64/00* (2013.01); *H04W 24/08* (2013.01)

(58) Field of Classification Search
CPC ..... H04W 64/00; H04W 24/08; H04W 12/12; H04Q 7/38
USPC ......... 455/456.1, 432.1, 433, 436, 444, 456.2
See application file for complete search history.

(56) References Cited

U.S. PATENT DOCUMENTS

| | | | | |
|---|---|---|---|---|
| 8,000,722 B2* | 8/2011 | Yan | ........................ | H04W 60/00 455/433 |
| 8,064,818 B2* | 11/2011 | Tobita | ...................... | H04W 4/02 455/3.01 |
| 2007/0111738 A1 | 5/2007 | Redell et al. | | |
| 2007/0197215 A1* | 8/2007 | Ben-Yehuda | .......... | H04W 24/02 455/433 |
| 2009/0061854 A1* | 3/2009 | Gillot | .................... | H04W 24/00 455/432.1 |
| 2012/0209773 A1* | 8/2012 | Ranganathan | ..... | G06Q 20/3224 705/44 |

FOREIGN PATENT DOCUMENTS

EP 1821566 A1 8/2007

OTHER PUBLICATIONS
International Preliminary Report on Patentability dated Feb. 11, 2014 pertaining to PCT/GB2012-051907.
International Search Report and Written Opinion dated Nov. 22, 2012 pertaining to International Application No. PCT/GB2012/051907.

* cited by examiner

*Primary Examiner* — Amancio Gonzalez
(74) *Attorney, Agent, or Firm* — Hayes Soloway, P.C.

(57) ABSTRACT

A method of locating a mobile device (25) registered to a home telecommunications network (11), the method comprising: monitoring (40) network transactions; identifying (42) a first type of network transaction (30) indicating that the mobile device (25) is connected to a component of a foreign telecommunications network; identifying (44) a second type of network transaction (30) indicating that the mobile device (25) has cancelled a connection to the component of the foreign telecommunications network; locating (46) the mobile device (25) on the basis of the identified first and second types of network transaction (30); wherein locating (46) the mobile device (25) comprises setting the location status of the mobile device (25) as: within the foreign telecommunications network (29) if a network transaction of the first type has been identified, and; within the home telecommunications network (11) if a network transaction of the second type has been identified and no further network transactions of the first type have been identified.

21 Claims, 7 Drawing Sheets

METHOD OF DETERMINING LOCATION

FIELD OF THE INVENTION

The present invention relates to a method of determining location. In particular, but not exclusively, it relates to a method of determining the location of a mobile device as it moves between different telecommunication networks. The invention extends to a system for locating a mobile device, a method of authenticating an event, a method of configuring the settings of a mobile device and a method of notifying a first user of the location of a mobile device associated with a second user.

BACKGROUND TO THE INVENTION

Today most people possess a mobile phone, and for many people mobile phones are viewed as essential items which they take with them wherever they go. Therefore, in many cases, determining the location of a mobile phone is equivalent to determining the location of the owner of that phone. Additionally, mobile phones are increasingly being used for more than simply sending and receiving phone calls, which further increases the likelihood that users will have their phone on their person at all times.

Today many consumers regularly travel abroad with their mobile phone. When they reach another country and connect to a foreign network, it is necessary for their home network provider to know that they have entered a new area, as they will need to apply the appropriate charges to any calls or text messages that the consumer sends or receives while they are roaming on that foreign network. Additionally most network providers will send a text message to notify their customers of the charges that will apply while they are in that country and roaming on a foreign network.

The knowledge that a mobile phone is roaming on a foreign network may be used in a number of applications. For example, one application is a fraud detection method in which a mobile phone customer subscribes to a service that monitors card transactions that are initiated abroad to check that they are legitimate. Under such a fraud prevention service, when a card transaction is initiated at a point-of-sale in a foreign country and sent to the customer's bank in their home country for verification, the bank may identify the country from which the card transaction has originated, and may then query the mobile network operator to which the customer's mobile phone is registered to find out the current location of the customer's mobile phone. If the mobile phone is in the same country as the bank card transaction, the bank may choose to authorise the transaction on the basis that the transaction is likely to be genuine if the card and mobile phone are in the same location. If the card transaction and mobile phone are in different locations, the bank may choose to block the transaction on the assumption that the card may have been stolen or cloned and is being used fraudulently.

In known prior art fraud prevention methods the location of the mobile phone is often determined by interfacing with the home telecommunications provider directly, to check whether the mobile phone has been registered as roaming on a foreign network, and if so, on which foreign network. One method of determining the location of the mobile device in known systems is to query the Home Location Register (HLR), which is essentially a database that each network provider holds which contains details relating to a customer's permanent services, for example the contract that they are subscribed to. The HLR also stores the most recently registered location of every mobile phone registered to the network provider, therefore this information can be extracted for this application. As this system requests the data that it needs directly, this is known as a "pull" method.

One drawback with a "pull" method such as this is that the process of querying the mobile phone in order to determine its location can take time, especially if the mobile phone is roaming on a foreign network. Therefore latency is introduced into the process which will delay the card transaction, which is often unacceptable.

It may also be necessary in such a pull system that the normal operation of the telecommunications network has to be modified to allow such a location request to be processed.

In alternative known prior art location methods a message may be sent to the mobile device itself with a request for its location to be provided to the requesting party. Again such methods may suffer from latency issues. Additionally, such methods are only effective with mobile devices that have the capability to determine their own location.

The fraud detection application is just one example of the ways in which location data for a mobile phone may be utilised; there are a number of other possible uses, many of which require accurate data without latency.

It is one object of the present invention to provide a system that determines the location of a customer's mobile phone which solves or at least mitigates the above described problems.

SUMMARY OF THE INVENTION

According to a first aspect of the invention there is provided a method of locating a mobile device registered to a home telecommunications network, the method comprising: monitoring network transactions; identifying a first type of network transaction indicating that the mobile device is connected to a component of a foreign telecommunications network; identifying a second type of network transaction indicating that the mobile device has cancelled a connection to the component of the foreign telecommunications network; locating the mobile device on the basis of the identified first and second types of network transaction; wherein locating the mobile device comprises setting the location status of the mobile device as: (i) within the foreign telecommunications network if a network transaction of the first type has been identified, and; (ii) within the home telecommunications network if a network transaction of the second type has been identified and no further network transactions of the first type have been identified.

The term "mobile device" may refer to a mobile phone, or to any other mobile device that may be registered with a telecommunications network provider, e.g. a smartphone, laptop with network connectivity or any other suitable mobile device.

The present invention is arranged to monitor the location of a mobile device that belongs (is registered) to a home telecommunications network by monitoring network transactions that pass through the telecommunications system.

Activity (e.g. information exchange) between a mobile device and the network and between network components is referred to as a "transaction" or "network transaction". Such network transactions may include information that is conveyed through the network, using a signalling protocol, related to setting up calls/ending calls, data exchanges, SMS messages, information that is conveyed through the network related to the current network component (e.g. mobile switching centre) that the mobile device is connected to, time data, phone data (e.g. IMEI). Such transactions are monitored in the present invention and first and second types of transaction are identified in order to determine the location of the mobile device. A network transaction that relates to the connection of the device to a foreign network component may be "listened out" for. Similarly, network transactions that indicate that a connection to a foreign network component has been cancelled may also be monitored and identified. On this basis the location of the device may be determined.

It is noted that by monitoring transactions that indicate that a connection to a foreign network component has been cancelled provides the benefit that the method is able to determine whether a mobile device is still in the location that the most recently received network transaction of the first type indicated. In particular, it means that if a mobile device which has been roaming on a foreign telecommunications network then returns to the home telecommunications network to which it is registered, the method is able to detect this.

Conveniently, wherein the monitoring of network transactions may be performed within the home telecommunications network and comprises monitoring SS7 protocol transactions. Monitoring may be performed by suitable network monitoring devices.

The first type of transaction that is identified may be from a mobile switching centre located in the foreign telecommunications network. Preferably, the first type of transaction may be an update location (UL) transaction. The second type of transaction may be from a network component of the home telecommunications network which is directed towards a network component located in the foreign telecommunications network. Preferably, the second type of transaction may be a cancel location (CL) transaction.

A typical telecommunications network may generate a large volume of network transactions every day and so conveniently, the method may further comprise filtering monitored network transactions to ignore any network transactions that do not either originate from a foreign telecommunications network or are not sent to a foreign telecommunications network. As an alternative however all network transactions may be monitored and the first type of transaction may an update location (UL) transaction sent from a foreign telecommunications network and the second type of transaction may be an update location (UL) transaction sent from a component of the home telecommunications network.

The method may further comprise setting the location status to indicate the mobile device is in a further foreign telecommunications network in the event of receiving a network transaction of the first type from the further foreign network.

The method may further comprise setting a location trigger relating to the mobile device to one of three categories: a first category to indicate that the mobile device has made an initial connection to a foreign telecommunications network; a second category to indicate that the mobile device has switched to a different foreign telecommunications network; and a third category to indicate that the mobile device has returned to its home telecommunications network.

The method may further comprise outputting a location notification signal to a third party, the signal comprising details of the current location of the mobile device. The method may also further comprise outputting a location notification signal to a third party, the signal comprising details of the time zone at the current location of the mobile device. The third party may be a card transaction server of a banking entity.

The method may also further comprise verifying the location of the mobile device by sending a location request to a home location register (HLR) within the home telecommunications network and comparing the location provided by the HLR to the location from the first and second type of transactions.

According to a second aspect of the present invention there is provided a system for locating a mobile device registered to a home telecommunications network, the system comprising: inputs for receiving monitored network transactions; processing means arranged to: identify a first type of network transaction indicating that the mobile device is connected to a component of a foreign telecommunications network; identify a second type of network transaction indicating that the mobile device has cancelled a connection to the component of the foreign telecommunications network; locate the mobile device on the basis of the identified first and second types of network transaction; wherein the system is arranged to locate the mobile device as: (i) within the foreign telecommunications network if a network transaction of the first type has been identified, and; (ii) within the home telecommunications network if a network transaction of the second type has been identified and no further network transactions of the first type have been identified.

According to a third aspect of the present invention there is provided a method of authenticating an event comprising: receiving a request for an event associated with a user, the request comprising data relating to a region where the event is being requested; determining the location of a mobile device associated with the user according to the first aspect of the invention; authenticating the requested event in dependence on the result of a comparison between the data relating to the region where the event is being requested and the location of the mobile device.

This aspect of the present invention enables an event, for example a card transaction at a point of sale, to be authorised by checking the location of the event with the location of the mobile device as determined by the first aspect of the present invention. The method may further comprise determining if the user associated with the mobile device has signed up to a service for authenticating the requested event.

According to a fourth aspect of the present invention there is provided a method of configuring the settings of a mobile device, comprising: determining the location of the mobile device according to the first aspect of the invention; looking up a model type of the mobile device from a data store; looking up configuration settings for the mobile device based on the location of the device; outputting the configuration settings to the mobile device.

According to the fourth aspect of the present invention the method of determining location of the mobile device according to the first aspect of the present invention may conveniently be used to configure the settings of a mobile device. A mobile network operator may conveniently maintain a list of mobile device model types that its subscribers use. Upon receiving a location update according to the first aspect of the invention the operator may check whether the model type associated with that mobile device has different configuration settings that are appropriate to its location in the foreign network. In the event that there are different configuration settings these can be output to the device.

According to a fifth aspect of the present invention there is provided a method of notifying a first user of the location of a mobile device associated with a second user, comprising determining the location of the mobile device associated with the second user according to the first aspect of the invention; outputting a notification message to the mobile device associated with the first user, the notification message comprising the location of the mobile device associated with the second user.

The fifth aspect of the present invention allows a first user to be notified of the location of the mobile device of the second user. The notification message may comprise the country of location of the second user and/or the time zone of the location of the second user. The notification message received by the mobile device of the first user may be used to update a display on the mobile device of the first user (e.g. a Contacts list may be updated to show the contacts of the first user who are abroad, what time zone they are in etc.).

Preferred features of the first aspect of the present invention may be applied to the second, third, fourth and fifth aspects of the present invention.

According to a sixth aspect of the present invention there is provided a method of authenticating an event comprising: receiving a request for an event associated with a user, the request comprising data relating to a region where the event is being requested; determining the location of a mobile device associated with the user; authenticating the requested event in dependence on the result of a comparison between the data relating to the region where the event is being requested and the location of the mobile device wherein the location of the module device is determined by: monitoring network transactions; identifying a network transaction indicating that the mobile device is connected to a component of a foreign telecommunications network; locating the mobile device on the basis of the identified network transaction.

According to a seventh aspect of the present invention there is provided a method of configuring the settings of a mobile device, comprising: determining the location of the mobile device; looking up a model type of the mobile device from a data store; looking up configuration settings for the mobile device based on the location of the device; outputting the configuration settings to the mobile device wherein the location of the module device is determined by: monitoring network transactions; identifying a network transaction indicating that the mobile device is connected to a component of a foreign telecommunications network; locating the mobile device on the basis of the identified network transaction.

According to an eighth aspect of the present invention there is provided a method of notifying a first user of the location of a mobile device associated with a second user, comprising determining the location of the mobile device associated with the second user; outputting a notification message to the mobile device associated with the first user, the notification message comprising the location of the mobile device associated with the second user wherein the location of the module device is determined by: monitoring network transactions; identifying a network transaction indicating that the mobile device is connected to a component of a foreign telecommunications network; locating the mobile device on the basis of the identified network transaction.

In the sixth, seventh and eighth aspects of the present invention the network transaction is conveniently an update location (UL) transaction. The location of the mobile device may conveniently be periodically updated. The monitored network transaction may be filtered, e.g. to only pass UL transactions originating from a foreign network into the locating step. If only foreign originating UL transactions are used then the device may be deemed to have returned home if no new UL transaction updates are received from the device after a given period of time (a device would normally periodically send a UL transaction even if it is not moving and so the absence of such transactions would indicate the device is no longer on a foreign network). Alternatively, the device may be arranged to send a message upon its return to the home network to an interested third party (e.g. a banking entity). Such a message could be sent as a text (SMS) message or via an app on a smartphone. Still further, home network originating UL transactions may be monitored as well and the receipt of a home UL transaction after receiving a period of foreign UL transactions would indicate the device has returned to its home network.

The invention extends to a carrier medium for carrying a computer readable code for controlling a server to carry out the method of the first, third to eight aspects of the invention.

BRIEF DESCRIPTION OF THE DRAWINGS

In order that the invention may be more readily understood, preferred non-limiting embodiments thereof will now be described with reference to the accompanying drawings, in which.

DETAILED DESCRIPTION OF THE EMBODIMENTS OF THE INVENTION

Figure 1:
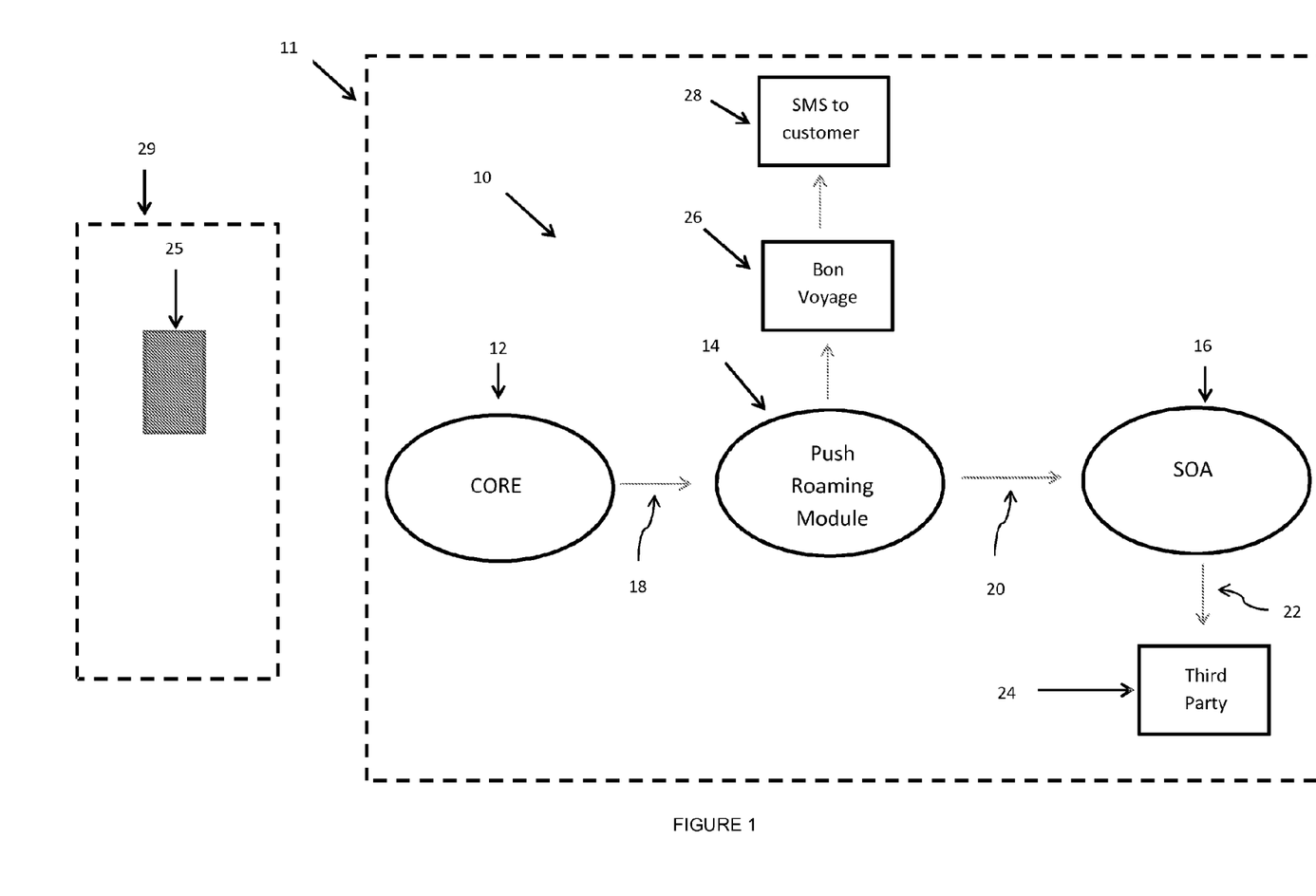
FIG. 1 is a schematic drawing of a location notification service according to an embodiment of the present invention.
Figure 2A:
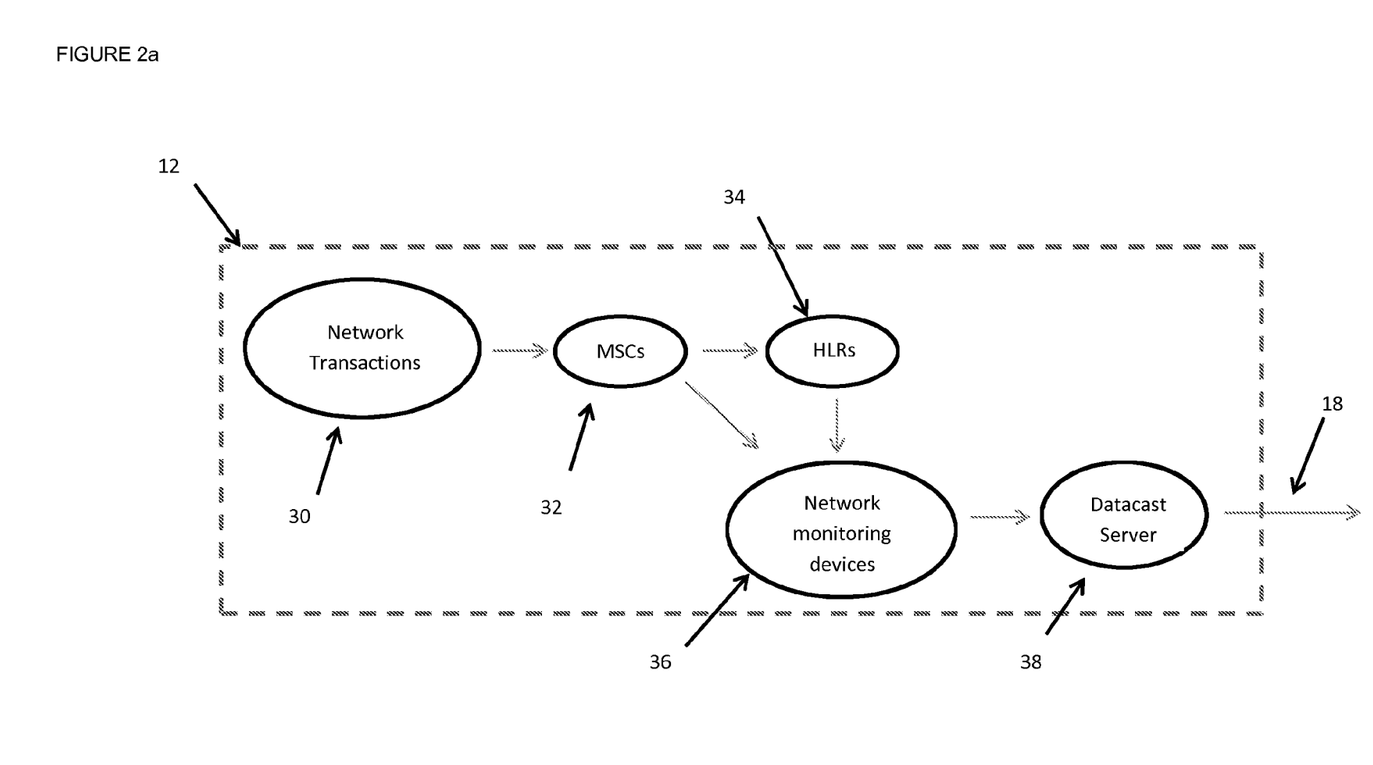
FIG. 2a is a more detailed schematic drawing of a component shown in FIG. 1.
Figure 2B:
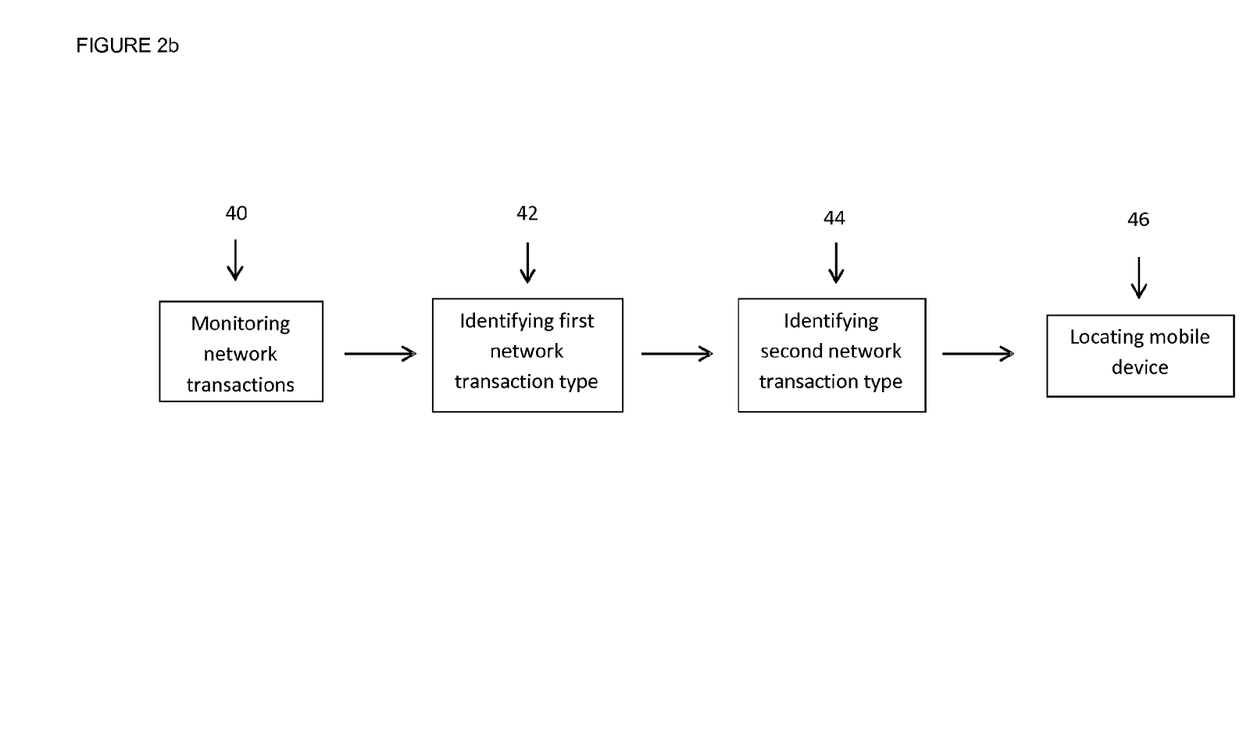
FIG. 2b is a schematic drawing showing the process that the location notification service in FIG. 1 undergoes in identifying the location of a mobile device.

Referring to FIGS. 1 and 2a, a location system 10 according to an embodiment of the present invention is shown which is located on a home network 11 belonging to a mobile telecommunications network provider. The location system 10 comprises three main components: a core network 12, a Push Roaming Module 14, and a Service Orientated Architecture (SOA) 16. The core network 12 has a data output 18 which is received by the Push Roaming Module 14, and the Push Roaming Module 14 has a data output 20 which is received by the SOA 16. The SOA 16 has a data output 22 to a third party 24 (e.g. a banking entity). The location system 10 is arranged to determine the location of a mobile device 25.

It is noted that FIG. 1 also shows a Bon Voyage Module 26, which is a component that is described more fully below which enables text messages (SMS messages 28) to be sent to users who are roaming outside of their home network 11 (i.e. users who are abroad and connected to a foreign network 29).

The core network 12 comprises a group of sub-components which is standard to any mobile phone network, and provides a platform for hosting phone calls and text messages, as well as holding data relating to all customers of the network provider to which the core network 12 belongs. FIG. 2a shows sub-components of the core network 12 which are used in embodiments of the present invention to determine the location of a mobile device 25. Many of the components shown in FIG. 2a comprise network transactions 30, Mobile Switching Centres (MSCs) 32, Home Location Registers (HLRs) 34, network monitoring devices 36 and a Datacast Server 38. These components are all an integral part of any modern 2G or 3G mobile phone network.

Within a telecommunication network, signalling provides the ability to transfer information within a network, between different networks and between subscribers of a network. Signalling System 7 (also referred to as SS7 (Global Standard abbreviation), C7 (UK), CCITT7 (UK), CCSS7 (USA) & N7 (Germany)) is a global standard signalling protocol that is using throughout the world within networks and between international networks. SS7/C7 is an example of a protocol that defines a standard set of information elements and methods of transporting data that enables the components of a network and of other networks to interoperate. Activity (e.g. information exchange) between a mobile device and the network and between network components is referred to herein as a "transaction" or "network transaction". Such network transactions may include information that is conveyed through the network, using the signalling protocol, related to setting up calls/ending calls, data exchanges, SMS messages, information that is conveyed through the network related to the current network component (e.g. mobile switching centre) that the mobile device is connected to, time data, phone data (e.g. NEI).

FIG. 2a shows the process that the location system 10 follows in order to determine the location of a mobile device 25. In Step 40, the location system 10 monitors network transactions. In Step 42, the system 10 identifies a first type of transaction. In Step 44, the system 10 identifies a second type of transaction 44. From these two transaction types, the location system 10 can identify the location of the mobile device in Step 46.

The home network 11 hosts various transactions 30, including calls and texts, and also location updates as the phone moves from one MSC 32 to another MSC 32 within a network. There may be over a billion location update transactions every day on a typical mobile phone network. These transactions 30 are conducted via the MSCs 32 and depending on the size and age of a telecoms network there may be between a handful or up to 100 or more MSCs 32 in a network.

Network transactions 30 may be monitored by network monitoring devices, which capture all Signalling System 7 (SS7) protocol transactions, where SS7 is the international standard telephony signalling protocol for a range of transactions. In embodiments of the present invention, the network monitoring devices may monitor update location (UL) transactions (which represent the first type of network transactions that are identified) and cancel location (CL) transactions (which represent the second type of network transactions that are identified). These may then be used in determining the location of a given mobile device 25.

Whenever a given mobile device 25 causes a transaction of any kind, this is sent to the MSC 32 that the mobile device 25 is currently connected to; usually the one that the phone is geographically nearest to. Therefore the network address of that MSC 32 can be used to identify the general location of the phone.

As a mobile device 25 moves to a new MSC 32 from a previous MSC 32 (e.g. because the mobile device 25 is travelling away from the previous MSC 32) the mobile device 25 will switch its connection to the new MSC 32. The process of switching generates an update location (UL) transaction in which the home network 11 is informed by the new MSC 32 that the mobile device 25 is trying to connect to it. The home network 11 (via the Home Location Register 34) will authenticate the connection to the new MSC 32 (based on factors such as calling plan features, whether the mobile device 25 is authorised to roam abroad etc.) and the new MSC 32 will then add the customer's profile to its database, which will be kept there until the MSC is instructed to remove it.

The UL transaction that is generated the first time a transaction, caused by a customer using their mobile device 25, goes through the new MSC 32 will comprise various information, such as the MSC's 32 network address, timestamp data and other general data that may be used to identify the phone (such as the mobile device number, IMEI etc.).

It is noted that the MSC 32 that a mobile device 25 is connected to may also periodically output UL transactions to the home network 11 even if the mobile device 25 is not moving.

UL transactions sent from an MSC 32 are routed to an HLR 34 within the home network 11. Each network provider will have at least one HLR 34, which is essentially a database containing data concerning details of the customer's permanent services. These permanent services are the facilities that are available to the customer based on the capabilities of their mobile device and their calling plan contract with the network provider. The contract may detail, for example, what calls the user may make and receive, how many text (SMS) messages they may send and receive and how much data they may send and receive etc. It is likely that the contract terms for home and abroad will be different. The permanent services may also include user defined services such as call diversion. The HLR 34 may also have some limited ability to create, send and receive data.

When an HLR 34 receives a UL transaction, it updates the customer's profile with the latest location (e.g. the network name or address of the new MSC 32 and/or the country code of the new MSC 32), and generates a cancel location (CL) transaction to be sent to the previous MSC 32 (i.e. the MSC 32 that the phone was previously connected to) that was registered in its database. This CL transaction is sent to the previous MSC 32 so that the previous MSC 32 can remove the customer's profile from its database.

In embodiments of the present invention UL and CL transactions are detected by the network monitoring devices 36. These transactions are then collated (in the arrangement of FIG. 2a this collation occurs on the Datacast Server 38) and then output 18 (from the Datacast Server 38) to the Push Roaming Module 14 shown in FIG. 1.

The Push Roaming Module 14 is a data processing module according to embodiments of the present invention which is arranged to receive input data from the core network 12 (e.g. via the Datacast Server 38 of FIG. 2) and to process that data to determine mobile devices (that are registered as customers with the home network provider) that are currently roaming on foreign telecommunication networks. Further, as noted below, the roaming module according to embodiments of the present invention may also detect when a mobile device 25 returns to the home network 11 after previously being in a roaming environment (on a foreign network 29).

It is also noted that the Push Roaming Module 14 may alert a Bon Voyage Module 26 whenever it detects that a mobile device 25 has recently started roaming on a foreign network 29.

A Bon Voyage Module 26 is a processing module within a telecommunications network that is arranged to notify a user, often via a text (SMS) message 28 that they have entered a roaming environment. Such "roaming SMS alerts" 28 may inform the user of local emergency numbers along with airtime and data charges within the roaming environment.

The SOA 16 shown in FIG. 1 is a platform environment that provides a common, secure and reusable interface to a myriad of third-party systems. In embodiments of the present invention described below, the SOA 16 platform is arranged to receive data from the Push Roaming Module 14 and then compile it into a format that is suitable for sending onto a third-party 24. The data that the SOA 16 outputs may be flexible, and tailored to the third-party's requirements. Typically, the output might include the location of the customer (in other words the location of the customer's mobile device 25), along with a timestamp for that location. The SOA 16 can be set up such that the third party pulls the data off it when required, or it can be configured to send data onto the third party automatically, either at regular intervals, or every time updated data is sent to the SOA 16.

The operation of the location method according to embodiments of the present invention is now described in more detail.

A typical telecoms network may generate over a billion UL and CL transactions every day and only a small proportion of these might relate to roaming users/mobile devices 25.

Therefore to track all network UL/CL transactions would be inefficient and consequently the UL transactions may be filtered by the network monitoring devices 36 such that only those transactions originating from a foreign network 29 are processed and forwarded to the roaming module 14. Similarly, the CL transactions may be filtered such that only those which are being sent to MSCs 32 on a foreign network 29 are processed and forwarded to the roaming module 14.

Once UL and CL transactions have been filtered, the network monitoring devices 36 are arranged to pass them on to the Datacast Server 38. The Datacast Server 38 is a server that, in this embodiment of the invention, collates the UL and CL transactions and then sends them onto the Push Roaming Module 14.

The transaction data received by the Push Roaming Module 14 is processed to determine the transaction type: UL or CL. It is noted that the transaction data received at the roaming module has been filtered such that it relates to "roaming related" transactions only (i.e. UL transactions from a foreign network 29 and CL transactions bound for a foreign network 29). (Although the embodiments of the invention described here utilise transaction filtering it is noted that in an alternative arrangement all transactions detected by the network monitoring devices 36 may be sent to the roaming module and the roaming module may be arranged to filter the data accordingly.)

UL transactions may optionally be forwarded to a Bon Voyage Module 26 from the roaming module 14 which bon voyage module 26 can then send a roaming SMS message 28 to a user's mobile device 25 to inform the user that they are roaming.

After receiving the roaming related UL and CL transactions, the Push Roaming Module 14 is arranged to extract data for location and time from both types of transaction. The UL transactions may then be used to determine when a mobile device 25 has entered a foreign network 29, or moved from one foreign network 29 to another. The CL transactions may be used to infer when a mobile device 25 has returned to the home network 11: when a mobile device 25 that was previously on a foreign network 29 returns to the home network 11, the Push Roaming Module 14 will receive a CL transaction that is directed to the last MSC 32 on the foreign network 29 that the mobile device 25 was connected to. If no further UL transaction is received that relates to a foreign network 29 component then the roaming module can determine that the mobile device 25 has returned to the home network 11.

CL transactions in the present embodiment of the invention are used to determine when a device 25 returns home because UL transactions that originate from the home network 11 when the mobile device 25 returns from a foreign network 29 and re-connects to the home network 11 may be filtered out by the network monitoring devices 36, and so the Push Roaming Module 14 may not see them. However, the CL transaction that is created by the HLR 34 in response to the first UL transaction from the home network component when the device 25 reconnects after a period of roaming will be sent to a foreign network 29, as it will need to go to the MSC 32 on which the mobile device 25 was previously registered in order to clear the customer's profile from that MSC 32. Therefore this CL transaction will be retained by the network monitoring devices 36 (as it is directed to a foreign telecommunications network) and sent on via the Datacast Server 38 to the Push Roaming Module 14.

In summary therefore, upon reconnection to the home network after being on a foreign network, the first UL transaction upon re-connection is filtered out (as it originates from a home network component and not a foreign network component) but the corresponding CL transaction is passed to the module 14. In turn, this means that if the Push Roaming Module 14 receives a CL transaction for which there was no corresponding UL transaction, the location system 10 can determine that the mobile device 25 has returned to the home network 11.

Once it has received UL and CL transactions from the Datacast Server 38, the Push Roaming Module 14 may use this data to create a series of Simple Object Access Protocol (SOAP) Extensible Markup Language (XML) triggers, and then may send these triggers to the SOA 16. These triggers may come in three different types, which may be: (i) a "start visit" trigger, which is generated when the Push Roaming Module 14 initially receives a UL transaction for a mobile device 25 from a foreign network 29. If the mobile device 25 is, at the time of receiving such a UL update transaction, registered in the HLR 34 database as being located within the home network 11 then such a UL transaction indicates that a visit has been started; (ii) a "change country" trigger, which is generated when the Push Roaming Module 14 detects a UL transaction for a mobile device 25 that is already registered on the database of mobile devices 25 that are currently abroad, such a UL transaction indicating that the device has moved to a different foreign network 29 in a different country; and (iii) an "end visit" trigger, which is generated when the Push Roaming Module 14 receives a CL transaction to indicate that the mobile device 25 has left the country where it was registered most recently, without a corresponding "roaming-type" UL transaction being detected, which is taken to indicate that the user has returned home.

In one embodiment of the invention, the SOA 16 receives all of the SOAP XML triggers from the Push Roaming Module 14 which have been generated from the UL and CL transactions, and then compiles those triggers into a format that is suitable for sending onto a third-party. The SOA 16 may be configured to automatically send new triggers onto the third-party as soon as the SOA 16 receives them.

Once this data has been received by a third party, there are a number of potential ways in which that they can use it. In one embodiment, the third party may be a bank that has set up a fraud detection system which their customers can subscribe to, in which location data from the above-described system is used to update a database showing where a subscriber is, so that if the subscriber's bank card is used to make a payment, the bank can quickly cross reference the location of the customer's phone against the location of the pending card transaction. If the card is in a different location to the phone, the bank may determine/decide that the card transaction is fraudulent and therefore deny it. A particular benefit provided by embodiments of the present invention described above is that the location method provides a "push" service, in which location data is updated as soon as it changes, so that when the bank requires the information, it is already available. In other known systems, or "pull" systems, the bank has been required to generate a query relating to the mobile device 25 in order to check what its current location is, which introduces a delay into the system which may be unacceptable for this type of application.

Figure 3:
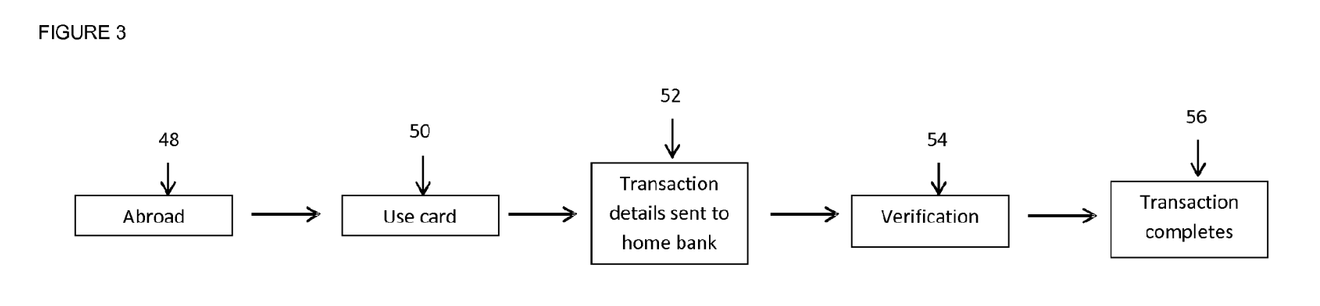
FIG. 3 is a schematic drawing of a bank card verification system in accordance with an embodiment of the present invention.
Figure 4:
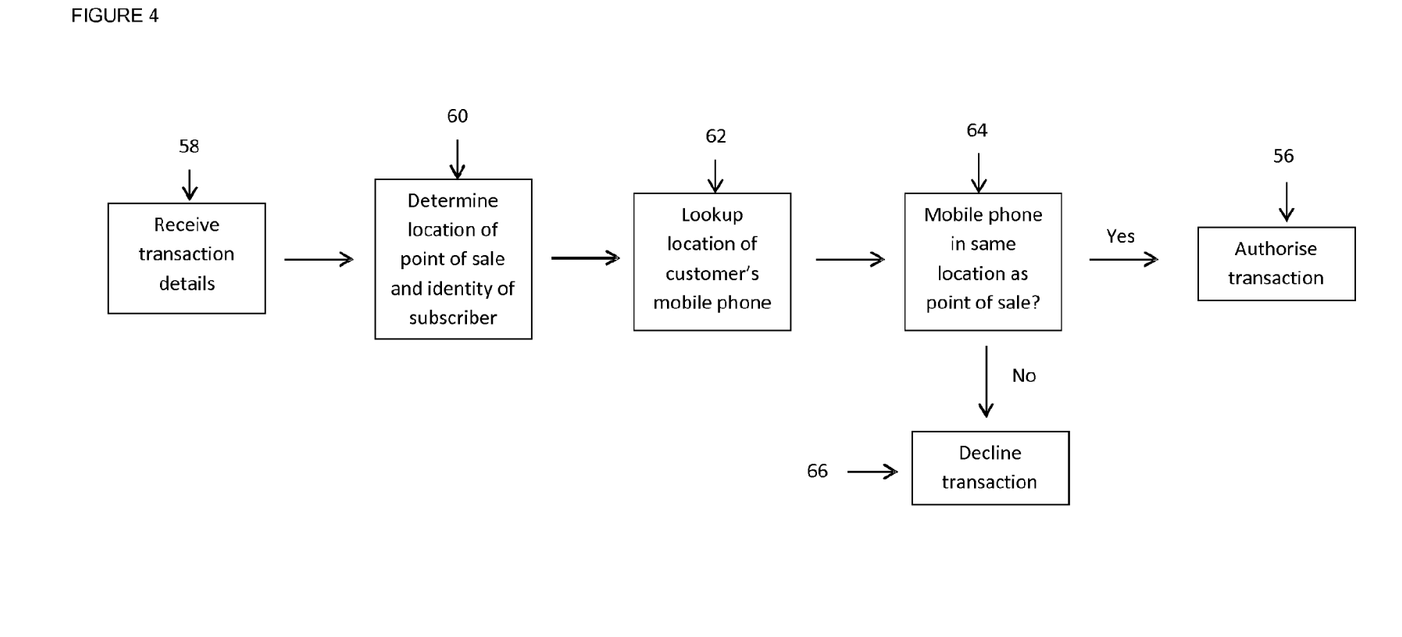
FIG. 4 is a schematic drawing showing the bank validation process step shown in FIG. 3.

The process of verifying a bank card transaction in this way is illustrated in FIGS. 3 and 4. In Step 48, a subscriber to the verification system travels abroad. In Step 50, the subscriber then attempts to use their bank card to make a purchase. When the card is used at a point of sale terminal, the details of the transaction are forwarded to the cardholder's bank in Step 52 for verification in Step 54. If the transaction is authorised (i.e. the transaction verification system determines that the point of sale terminal and the subscriber's mobile device are in the same location) then the transaction may be authenticated in Step 56.

FIG. 4 shows the process of verification in Step 54 above in more detail. In Step 58, the bank verification system receives the transaction details from the point of sale terminal (or from the point of sale system associated with that terminal). In Step 60, the bank verification system determines the location of the point of sale terminal from the received transaction details. Additionally, the bank verification system looks up the details associated with that subscriber, e.g. subscriber identity and details of the mobile device associated with that subscriber/user.

In Step 62, the bank verification system then looks up the current location 62 of the subscriber's mobile device 25 in the database which has been created from data that has been forwarded by the push location system 10, and checks whether the location of the mobile device is the same as the location of the point of sale 64. If the subscriber's mobile device 25 is in the same location as the point of sale of the card transaction, the bank verification system may authorise the transaction in Step 56. If the location of the mobile device 25 is different to that of the point of sale of the card transaction, the bank verification system may decline the card transaction 66.

The ability of the location method to determine when a mobile device has returned to the home network provides an additional advantage in that the bank verification system may be configured to track the subscriber's return home. This enables the system to detect when fraudulent activities are occurring in the event that the card has been mislaid or stolen abroad but the user has returned home. In this arrangement the user's mobile device would appear back in the home network but the transaction details from the card would indicate that the user was still abroad. Tracking the user's return home would also allow the banking entity providing the verification system to remove the user from their list of customers who are marked as being abroad without the user needing to contact the banking entity.

Figure 5:
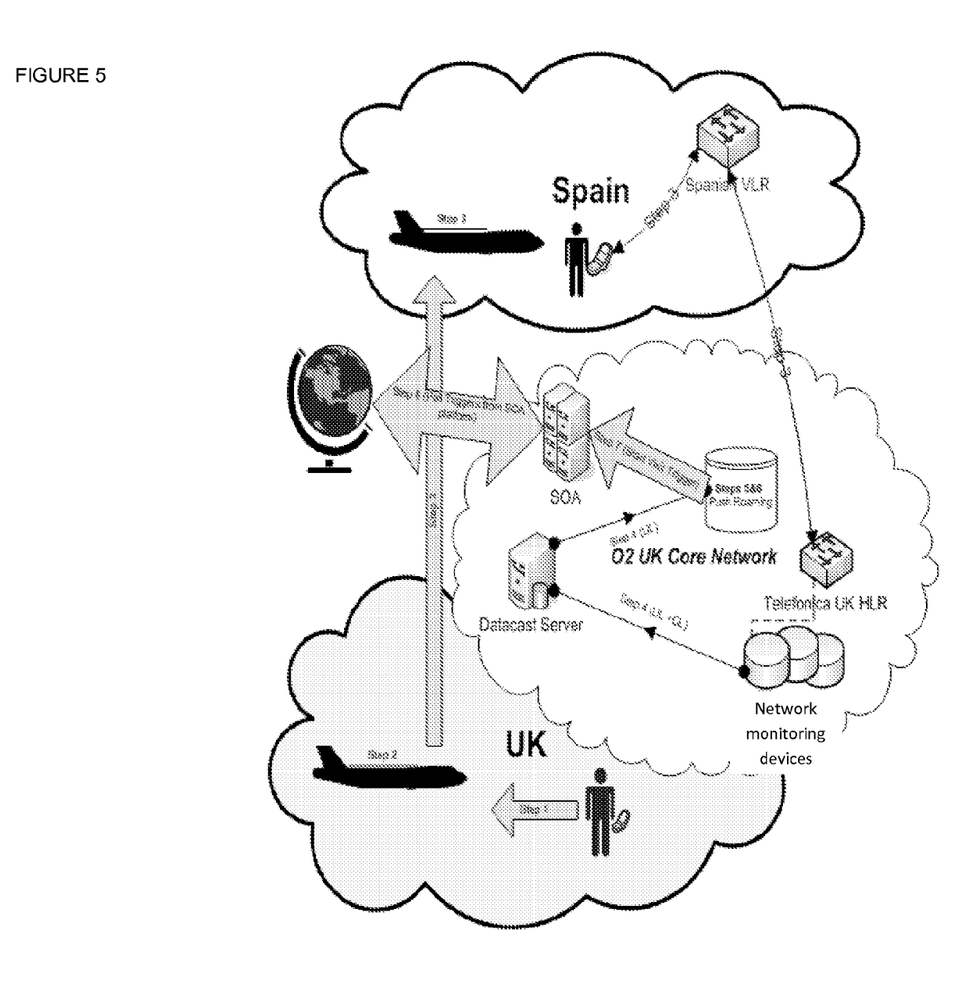
FIG. 5 depicts an example journey that a mobile phone customer may undertake to illustrate how embodiments of the present invention may be used to locate the mobile phone.
Figure 6:
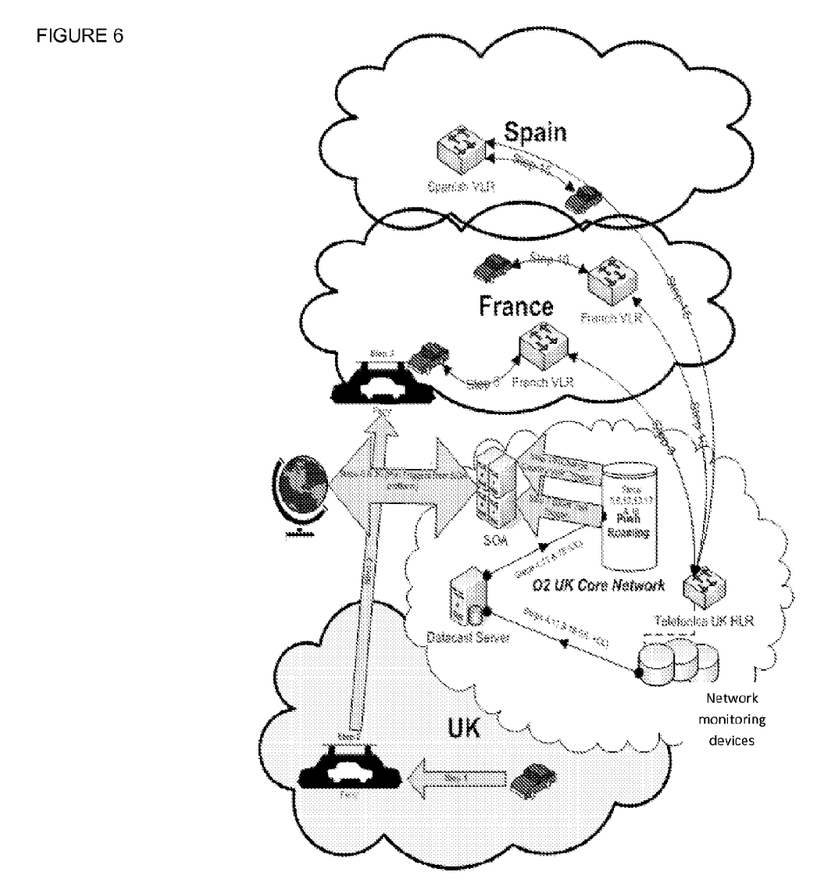
FIG. 6 depicts a second example journey.
Figure 7:
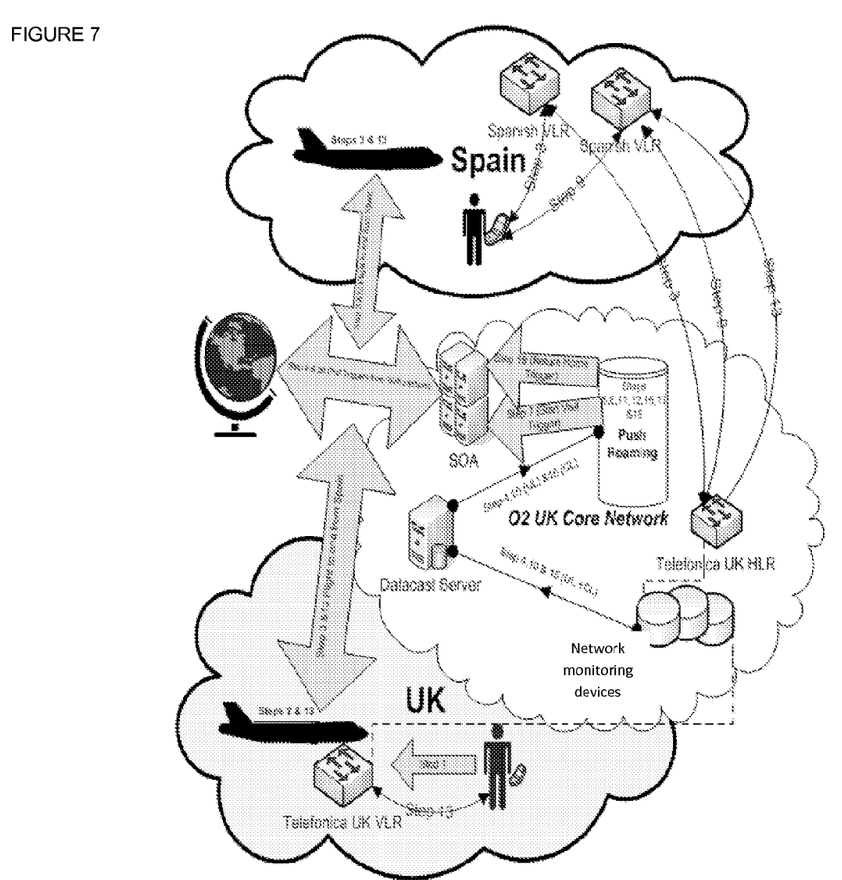
FIG. 7 is an illustration of a third example journey in which the mobile phone customer undertakes the journey in FIG. 5 and then returns to their home network.

With reference to FIGS. 5, 6 and 7, some examples of typical journeys that might be undertaken by a mobile device 25 customer are given, with the events of each example journey, at each stage of the journey, described below.

In a first example journey, shown in FIG. 5, a customer takes their mobile device 25 to Spain, resulting in the following steps:

In step 1 of FIG. 5, the subscriber leaves home and travels to a local UK airport. The mobile device 25 is located on the home network 11 during this journey, hence no events are being passed to the Push Roaming Module 14.

At step 2 of FIG. 5, the subscriber boards a plane. The mobile device 25 is switched off, therefore no events are sent to the Push Roaming Module 14. The subscriber then lands in Spain in step 3 of FIG. 5, and switches the mobile device 25 on. The mobile device 25 detects a Spanish network operator network and performs a UL transaction. This transaction will be sent from the Spanish mobile operator to the home network's HLR 34 for authentication (security check) and available services check (e.g. is the handset allowed to roam on a foreign network 29?). If authentication and available services checks are successful, then the transaction sent to the Spanish network is allowed to complete successfully. The mobile device 25 will now show the name of the Spanish network operator on its screen.

At step 4 of FIG. 5 a network monitoring device, for example a "Tektronix Spi-Probe", picks up and passes the UL transaction to the Datacast Server 38 for onward transit to the Push Roaming Module 14, as the UL has met the filter criteria outlined hereinbefore (it is a UL transaction that has originated from a foreign mobile network).

In step 5 of FIG. 5 the Push Roaming Module 14 receives the UL transaction and checks its database to see if a record exists for this subscriber's MSISDN (Mobile Number) or IMSI (unique mobile identification code). In this example scenario no entry exists as the subscriber is performing UL on a foreign network 29 for the first time. The Push Roaming Module 14 will create a database entry for this subscriber recording the MSISDN, IMSI, Virtual Location Register (VLR; the name of the foreign network operator's MSC 32) and the timestamp of the transaction being received by the application.

At step 6 of FIG. 5, the Push Roaming Module 14 applies its defined logic to this transaction. In this case, this is the first time that the Push Roaming Module 14 has detected this subscriber, so its logic is set to create a SOAP XML trigger with a "Start Visit" header.

The SOAP XML trigger is passed in step 7 of FIG. 5 from the Push Roaming Module 14 to the SOA, for storage and filtering against a published subscriber list provided by a third party (for example in the fraud detection system example the banking entity may have a list of its customers who have subscribed to the fraud detection service. The SOA 16 may then filter the triggers it receives against user's who have signed up to the service. In this manner the banking entity only receives roaming data related to its customers who have signed up to the service).

In step 8 of FIG. 5 the third party either pulls this information from the SOA 16 environment into their own internal system or the SOA 16 is arranged to push the roaming data into the third party's system. At this point this information has left the home network 11 environment.

In a second example journey, shown in FIG. 6, a customer takes their mobile device 25 to France first, and then on to Spain, resulting in the following steps:

In step 1 of FIG. 6 the subscriber leaves their home and travels to a local UK ferry port. Their mobile device 25 is located on the home network 11 during this journey, hence no events are being passed to the Push Roaming Module 14.

While the subscriber sails from the UK to France in step 2 of FIG. 6, their mobile device 25 is left on to pick up whatever networks it detects on the journey across the channel.

In step 3 of FIG. 6 the subscriber's mobile device 25 detects a French network operator during the crossing and performs a UL transaction. This transaction will be sent from the French mobile operator to the home network's HLR 34 for authentication and an available services check. If the authentication and the available services checks are successful then a transaction is sent to the French network to allow the UL transaction to complete successfully. The mobile device 25 will now show the name of the French network operator on its screen.

At step 4 of FIG. 6a network monitoring device, for example a "Tektronix Spi-Probe", picks up and passes the UL transaction to the Datacast Server 38 for onward transit to the Push Roaming Module 14, as the UL has met the filter criteria outlined hereinbefore.

In step 5 of FIG. 6 the Push Roaming Module 14 receives the UL transaction and checks its database to see if a record exists for this subscriber's MSISDN (Mobile Number) or IMSI (unique mobile identification code). In this example scenario no entry exists as the subscriber is performing UL on a foreign network 29 for the first time. The Push Roaming Module 14 will create a database entry for this subscriber recording the MSISDN, IMSI, Virtual Location Register (VLR; the name of the foreign network operator's MSC 32) and the timestamp of the transaction being received by the application.

At step 6 of FIG. 6, the Push Roaming Module 14 applies its defined logic to this transaction. In this case, this is the first time that the Push Roaming Module 14 has detected this subscriber, so its logic is set to create a SOAP XML trigger with a "Start Visit" header.

The SOAP XML trigger is passed in step 7 of FIG. 6 from the Push Roaming Module 14 to the SOA, for storage and filtering against a published subscriber list provided by a third party.

In step 8 of FIG. 6 the third party pulls this information from the SOA 16 environment into their own internal system (or alternatively the roaming information is pushed into their system). At this point this information has left the home network 11 environment.

In step 10 of FIG. 6 the subscriber begins to drive through France to Spain. During this time the subscriber's mobile device 25 performs regular UL transactions as it travels through France. Each time the subscriber's device performs a UL transaction, this transaction will be sent from the French mobile operator to the home network HLR 34 for authentication and an available services check. If the authentication and the available services check are successful, then the UL transaction will be sent to the French network to allow the UL transaction to complete successfully. The mobile device 25 will continue to show the name of the French network operator on its screen. The network monitoring device will pick up and pass the UL transaction to the Datacast Server 38 for onward transit in step 11 of FIG. 6 to the Push Roaming Module 14 as the UL transaction has met the filter criteria outlined hereinbefore.

The Push Roaming Module 14 receives the UL transaction in step 12 of FIG. 6, and checks its database to see if a record exists for this subscriber's MSISDN (Mobile Number) or IMSI (unique mobile identification code). In this example scenario an entry already exists as per "step 5". The Push Roaming Module 14 will amend the existing database entry with a new VLR and the timestamp of the transaction being received by the Push Roaming Module 14.

In step 13 of FIG. 6 the Push Roaming Module 14 applies its defined logic to this transaction. In this case this is a UL transaction for an existing database entry, so the Push Roaming Module 14 will check to see if the subscriber's status has changed in such a way that requires the generation of an event. On this occasion, although the subscriber has moved from one VLR to another, both VLRs have the same country code. Hence no SOAP XML trigger is required, as the application has already advised the third party users that the subscriber is in France with its initial "Start Visit" trigger.

The subscriber then crosses the border of France and enters Spain in step 15 of FIG. 6. At this point the subscriber's mobile device 25 detects a Spanish network operator and performs a UL transaction. This transaction will be sent from the Spanish mobile operator to the home network HLR 34 for authentication and an available services check. If the authentication and the available services check are successful, then the UL transaction will be sent to the Spanish network to allow the UL transaction to complete successfully. The mobile device 25 will continue to show the name of the Spanish network operator on its screen.

In step 16 of FIG. 6 the network monitoring devices 36 picks up and passes the UL transaction to the Datacast Server 38 for onward transit to the Push Roaming Module 14 as the UL transaction has met the filter criteria outlined hereinbefore.

The Push Roaming Module 14 receives the UL transaction in step 17 of FIG. 6, and checks its database to see if a record exists for this subscriber's MSISDN or IMSI. In this example scenario a database entry exists as the subscriber has been travelling through France performing multiple UL transactions en route. The Push Roaming Module 14 will amend the existing database entry with the new VLR and timestamp of the transaction being received by the application.

The Push Roaming Module 14 then applies its defined logic to this transaction. It checks to see if the subscriber's status has changed in such a way that requires the generation of an event. On this occasion the subscriber has moved from a French VLR to a Spanish VLR, hence demonstrating a change of country. As such, the Push Roaming Module 14's logic will create a "Change Country" SOAP XML trigger to advise of this change of location.

In step 19 of FIG. 6 the SOAP XML trigger is passed from the Push Roaming Module 14 to the SOA 16 for storage and filtering against published subscriber list provided by the third party. The third party then pulls this information from the SOA 16 into their own internal system (or alternatively the information is pushed into the third party's system). At this point this information has left the home network 11 environment.

In a third example journey, shown in FIG. 7, a customer takes their mobile device 25 to Spain, and then returns to the home network 11, resulting in the following steps:

For step 1 of FIG. 7, the subscriber leaves home and travels to a local UK airport. The mobile device 25 is located on the home network 11 during this journey, hence no events are being passed to the Push Roaming Module 14.

At step 2 of FIG. 7, the subscriber boards a plane. The mobile device 25 is switched off, therefore no events are sent to the Push Roaming Module 14. The subscriber then lands in Spain in step 3 of FIG. 7, and switches the mobile device 25 on. The mobile device 25 detects a Spanish network operator network and performs a UL transaction. This transaction will be sent from the Spanish mobile operator to the home network's HLR 34 for authentication (security check) and available services check (is handset allowed to roam on a foreign network 29). If authentication and available services checks are successful, then the transaction sent to the Spanish network is allowed to complete successfully. The mobile device 25 will now show the name of the Spanish network operator on its screen.

At step 4 of FIG. 7a network monitoring device, for example a "Tektronix Spi-Probe", will pick up and pass the UL transaction to the Datacast Server 38 for onward transit to the Push Roaming Module 14, as the UL has met the filter criteria outlined hereinbefore.

In step 5 of FIG. 7 the Push Roaming Module 14 receives the UL transaction and checks its database to see if a record exists for this subscriber's MSISDN (Mobile Number) or IMSI (unique mobile identification code). In this example scenario no entry exists as the subscriber is performing UL on a foreign network 29 for the first time. The Push Roaming Module 14 will create a database entry for this subscriber recording the MSISDN, IMSI, Virtual Location Register (VLR; the name of the foreign network operator's MSC 32) and the timestamp of the transaction being received by the application.

At step 6 of FIG. 7, the Push Roaming Module 14 applies its defined logic to this transaction. In this case, this is the first time that the Push Roaming Module 14 has detected this subscriber, so its logic is set to create a SOAP XML trigger with a "Start Visit" header.

The SOAP XML trigger is passed in step 7 of FIG. 7 from the Push Roaming Module 14 to the SOA, for storage and filtering against published subscriber list provided by a third party.

In step 8 of FIG. 7 the third party pulls this information from the SOA 16 environment into their own internal system (or alternatively the information is pushed into the third party system). At this point this information has left the home network 11 environment.

The subscriber remains in Spain for 1 week, during which time the mobile device 25 performs regular UL transactions. Each time the mobile device 25 performs a UL transaction, this transaction will be sent from the Spanish mobile operator to the home network HLR 34 for authentication and an available services check. If the authentication and the available services checks are successful, then the UL transaction is sent to the Spanish network to allow the UL transaction to complete successfully. The mobile device 25 will now show the name of the Spanish network operator on its screen.

At step 9 of FIG. 7 the network monitoring device will pick up and pass the UL transaction to the Datacast Server 38 for onward transit to the Push Roaming Module 14 in step 10 of FIG. 7, as the UL transaction has met the filter criteria outlined hereinbefore.

In step 11 of FIG. 7 the Push Roaming Module 14 receives the UL transaction and checks its database to see if a record exists for this subscriber's MSISDN or IMSI. In this example scenario an entry already exists as per "step 5". The Push Roaming Module 14 will amend the existing database entry to reflect the new VLR and the timestamp of the transaction being received by the application.

The Push Roaming Module 14 will then apply its defined logic to this transaction. In this case this is a UL transaction for an existing database entry, therefore the Push Roaming Module 14 will check to see if the subscriber's status has changed in such a way that requires the generation of an event. On this occasion although the subscriber has moved from one VLR to another VLR, or has remained on the same VLR, the VLR identities have the same country code, hence the no SOAP XML trigger is required. The application has already advised the third party user that the subscriber is in Spain with its initial "Start Visit" trigger.

In step 13 of FIG. 7 the subscriber flies back to the UK and switches on the mobile device 25 when they arrive. The mobile device 25 detects the home network 11 and performs a UL transaction. This transaction will be sent from the home network 11 to the home network's HLR 34 for authentication and an available services check. If the authentication and the available services checks are successful, the mobile device 25 will now show the name of the home network operator on its screen.

Step 13 of FIG. 7 will not result in a UL transaction being sent to the Push Roaming Module 14 as this transaction does not trigger activity by the network monitoring device filter to pass this transaction forward to the Datacast Server 38 (as the UL transaction has originated within the home network 11 as opposed to from a foreign network 29). However, the UL transaction from within the home network 11 is accompanied by the generated of a CL transaction by the HLR 34 register that is to be sent to the last MSC 32 that the mobile device 25 was connected to on the Spanish mobile network. Therefore, instead the network monitoring device picks up and passes the Spanish-bound CL transaction to the Datacast Server 38 in step 15 of FIG. 7 for onward transit to the Push Roaming Module 14, as the CL transaction has met the filter criteria outlined hereinbefore.

In step 16 of FIG. 7 the Push Roaming Module 14 receives the CL transaction and checks its database to see if a record exists for this subscriber's MSISDN or IMSI. In this example scenario an entry exists as the subscriber has previously performed UL transactions on a foreign network 29. The Push Roaming Module 14 will amend its database entry for this subscriber, recording that it has received a CL transaction. The Push Roaming Module 14 will create an entry for the timestamp of that transaction and will begin to run a timing routine against that transaction of 5 minutes duration.

In step 17 of FIG. 7, if no subsequent UL transaction is received within 5 minutes the Push Roaming Module 14 will apply its logic against this subscriber's profile. Therefore the CL transaction shows that the subscriber is no longer located on the previous foreign network 29, yet the system has no evidence to prove the mobile device 25 is located on any other foreign network 29, hence it will conclude that the subscriber has returned home to the UK.

As a result of the activity outlined in Step 17 of FIG. 7, the Push Roaming Module 14 logic is set to create a SOAP XML trigger with a "Return Home" header. The SOAP XML trigger is passed from the Push Roaming Module 14 to the SOA 16 in step 19 of FIG. 7, for storage and filtering against a published subscriber list provided by the third party.

In step 20 of FIG. 7 the third party pull this information from the SOA 16 environment into their own internal system (or alternatively the information is pushed from the SOA 16 into the third party system). At this point this information has left the home network 11.

The above described method of locating a mobile device 25 may be used in a bank card fraud prevention system and method as described above. Further applications of the location method according to embodiments of the present invention may comprise the use of location data to optimise device configuration settings and the use of such a location method to present location data to other users of the mobile telecommunication network about roaming users.

The location method according to embodiments of the present invention may therefore be used to optimise the configuration settings of a user's device 25 when they are roaming outside their home network. In this application the location data may be output by the SOA 16 to the network operator itself (e.g. the "third party" 24 in FIG. 1 is the home network operator).

The network operator of the home network 11 may maintain a database of the mobile device type that each user of its network uses to connect to the home network. Such a database may additionally comprise configuration settings to be applied to each mobile device type to enable the mobile device to connect correctly to the network and use services such as mobile internet.

In some instances it is envisaged that the mobile device type configuration settings for use in a roaming environment may differ from those configuration settings to be used in the home network. Such differences may be network operator imposed (e.g. different levels of service may be available when abroad) or may be user configurable (e.g. the user may ask the network operator to configure its data connection settings such that no data can be accessed while outside of the home network).

According to the configuration settings application the network operator may cross check its configuration settings database upon receiving a communication from the SOA 16 that one of its users is roaming. If the configuration settings for the current (foreign) location of the user differ from the home network settings the network operator may push new settings in a settings message to the user to optimise their experience while abroad. The settings message may take the form of an SMS message or an over-the-air update of the settings on the device.

When the network receives a "change country" trigger the configuration settings may be checked and updated as necessary. When the network receives a "return home" trigger then it may output a settings message to return the configuration settings to the home network settings.

In a further application of the location method according to embodiments of the present invention, the Push Roaming Module 14 may be configured to update a user's address book on their mobile device to show more detailed information to the user (user A) for contacts stored in their address book (subject to appropriate opt-in and permission from owners of the phone numbers stored in the user's phone book). Such information could include the time zone of a given user in the Contacts list (user B) next to their name (e.g. GMT/BST−7 hours), the actual time of for user B either in the time zone they are in or time zone in reference to the time zone of user A. A further implementation could display the actual country the contact (user B) is in at the time (along with time zone information) or a more basic implementation may simply show that they are abroad and indicate if it is daytime or night-time where user B is currently located. Different usage scenarios and implementations may be envisaged depending upon the design of the application.

It will be appreciated by a person skilled in the art that the invention could be modified to take many alternative forms to that described herein, without departing from the scope of the appended claims.

The invention claimed is:

1. A method of authenticating an event comprising:
receiving a request for an event associated with a user, the request comprising
data relating to a region where the event is being requested;
determining the location of a mobile device associated with the user, the mobile device being registered to a home telecommunications network;
authenticating the requested event in dependence on the result of a comparison between the data relating to the region where the event is being requested and the location of the mobile device;
wherein, determining the location of the mobile device associated with the user, comprises:
monitoring network transactions;
identifying a first type of network transaction indicating that the mobile device is connected to a component of a foreign telecommunications network;
identifying a second type of network transaction indicating that the mobile device has cancelled a connection to the component of the foreign telecommunications network;
locating the mobile device on the basis of the identified first and second types of network transaction;
wherein locating the mobile device comprises setting the location status of the mobile device as:
(i) within the foreign telecommunications network if a network transaction of the first type has been identified, and;
(ii) within the home telecommunications network if a network transaction of the second type has been identified and no further network transactions of the first type have been identified.

2. The method as claimed in claim 1, wherein the monitoring of network transactions is performed by network monitoring devices within the home telecommunications network.

3. The method as claimed in claim 1, wherein the first type of transaction is from a mobile switching center located in the foreign telecommunications network.

4. The method as claimed in claim 1, wherein the first type of transaction is an update location (UL) transaction.

5. The method as claimed in claim 1, wherein the second type of transaction is from a network component of the home telecommunications network and which is directed towards a network component located in the foreign telecommunications network.

6. The method as claimed in claim 1, wherein the second type of transaction is a cancel location (CL) transaction.

7. The method as claimed in claim 1, further comprising filtering monitored network transactions to ignore any network transactions that do not either originate from a foreign telecommunications network or are not sent to a foreign telecommunications network.

8. The method as claimed in claim 1, wherein the first type of transaction is an update location (UL) transaction sent from a foreign telecommunications network and the second type of transaction is an update location (UL) transaction sent from a component of the home telecommunications network.

9. The method as claimed in claim 1, further comprising setting the location status to indicate the mobile device is in a further foreign telecommunications network in the event of receiving a network transaction of the first type from the further foreign network.

10. The method as claimed in claim 1, further comprising setting a location trigger relating to the mobile device to one of three categories: a first category to indicate that the mobile device has made an initial connection to a foreign telecommunications network; a second category to indicate that the mobile device has switched to a different foreign telecommunications network; and a third category to indicate that the mobile device has returned to its home telecommunications network.

11. The method as claimed in claim 1, further comprising outputting a location notification signal to a third party, the signal comprising details of the current location of the mobile device, and further comprising details of the time zone at the current location of the mobile device.

12. The method as claimed in claim 11, wherein the third party comprises a card transaction server of a banking entity.

13. The method as claimed in claim 1, further comprising verifying the location of the mobile device by sending a location request to a home location register (HLR) within the home telecommunications network and comparing the location provided by the HLR to the location from the first and second type of transactions.

14. The method as claimed in claim 1, further comprising determining if the user associated with the mobile device has signed up to a service for authenticating the requested event.

15. The non-transitory computer readable medium for carrying a computer readable code for controlling a server to carry out the method of claim 1.

16. A system using the process as claimed in claim 1 for authenticating the event, the system comprising:
- means for receiving the request for the event associated with a user;
- means for determining the location of the mobile device associated with the user;
- means for authenticating the requested event in dependence on the result of the comparison between the data relating to the region;
- the means for determining the location of the mobile device associated with the user, comprising:
    - inputs for receiving monitored network transactions;
    - processing means arranged to:
        - identify the first type of network transaction indicating that the mobile device is connected to the component of the foreign telecommunications network;
        - identify the second type of network transaction indicating that the mobile device has cancelled the connection to the component of the foreign telecommunications network; and
        - locate the mobile device on the basis of the identified first and second types of network transaction;
    - wherein the system is arranged to locate the mobile device as:
        - (i) within the foreign telecommunications network if the network transaction of the first type has been identified, and;
        - (ii) within the home telecommunications network if the network transaction of the second type has been identified and no further network transactions of the first type have been identified.

17. A method of configuring the settings of a mobile device registered to a home telecommunications network, comprising:
- determining the location of the mobile device;
- looking up a model type of the mobile device from a data store;
- looking up configuration settings for the mobile device based on the location of the device and the mobile type;
- outputting the configuration settings to the mobile device;
wherein, determining the location of a mobile device, comprises:
- monitoring network transactions;
- identifying a first type of network transaction indicating that the mobile device is connected to a component of a foreign telecommunications network;
- identifying a second type of network transaction indicating that the mobile device has cancelled a connection to the component of the foreign telecommunications network;
- locating the mobile device on the basis of the identified first and second types of network transaction;
- wherein locating the mobile device comprises setting the location status of the mobile device as:
    - (i) within the foreign telecommunications network if a network transaction of the first type has been identified, and;
    - (ii) within the home telecommunications network if a network transaction of the second type has been identified and no further network transactions of the first type have been identified.

18. A system using the process as claimed in claim 17 for configuring the settings of the mobile device registered to the home telecommunications network, comprising:
- means for determining the location of the mobile device;
- means for looking up the model type of the mobile device from the data store;
- means for looking up configuration settings for the mobile device based on the location of the device and the mobile type;
- means for outputting the configuration settings to the mobile device;
- the means for determining the location of the mobile device comprising:
    - inputs for receiving monitored network transactions;
    - processing means arranged to:
        - identify the first type of network transaction indicating that the mobile device is connected to the component of a foreign telecommunications network;
        - identify the second type of network transaction indicating that the mobile device has cancelled the connection to the component of the foreign telecommunications network; and
        - locate the mobile device on the basis of the identified first and second types of network transaction;
    - wherein the system is arranged to locate the mobile device as:
        - (i) within the foreign telecommunications network if the network transaction of the first type has been identified, and;
        - (ii) within the home telecommunications network if the network transaction of the second type has been identified and no further network transactions of the first type have been identified.

19. A method of notifying a first user of the location of a mobile device associated with a second user, the mobile device associated with the second user being registered to a home telecommunications network, the method comprising
- determining the location of the mobile device associated with the second user;
- outputting a notification message to the mobile device associated with the first user, the notification message comprising the location of the mobile device associated with the second user;
wherein determining the location of a mobile device associated with the second user, comprises:
- monitoring network transactions;
- identifying a first type of network transaction indicating that the mobile device is connected to a component of a foreign telecommunications network;
- identifying a second type of network transaction indicating that the mobile device has cancelled a connection to the component of the foreign telecommunications network;
- locating the mobile device on the basis of the identified first and second types of network transaction;
- wherein locating the mobile device comprises setting the location status of the mobile device as:
    - (i) within the foreign telecommunications network if a network transaction of the first type has been identified, and;
    - (ii) within the home telecommunications network if a network transaction of the second type has been identified and no further network transactions of the first type have been identified.

20. The method as claimed in claim 19, wherein the notification message comprises a country of location of the mobile device associated with the second user.

21. A system using the process as claimed in claim 19 for notifying the first user of the location of the mobile device associated with the second user, comprising
  means for determining the location of the mobile device associated with the second user;
  means for outputting the notification message to the mobile device associated with the first user;
  where the means for determining the location of the mobile device associated with the second user comprising:
    inputs for receiving monitored network transactions;
    processing means arranged to:
      identify the first type of network transaction indicating that the mobile device is connected to the component of the foreign telecommunications network;
      identify the second type of network transaction indicating that the mobile device has cancelled the connection to the component of the foreign telecommunications network; and
      locate the mobile device on the basis of the identified first and second types of network transaction;
    wherein the system is arranged to locate the mobile device as:
      (i) within the foreign telecommunications network if the network transaction of the first type has been identified, and;
      (ii) within the home telecommunications network if the network transaction of the second type has been identified and no further network transactions of the first type have been identified.

\* \* \* \* \*